United States Patent Office 2,937,334
Patented May 17, 1960

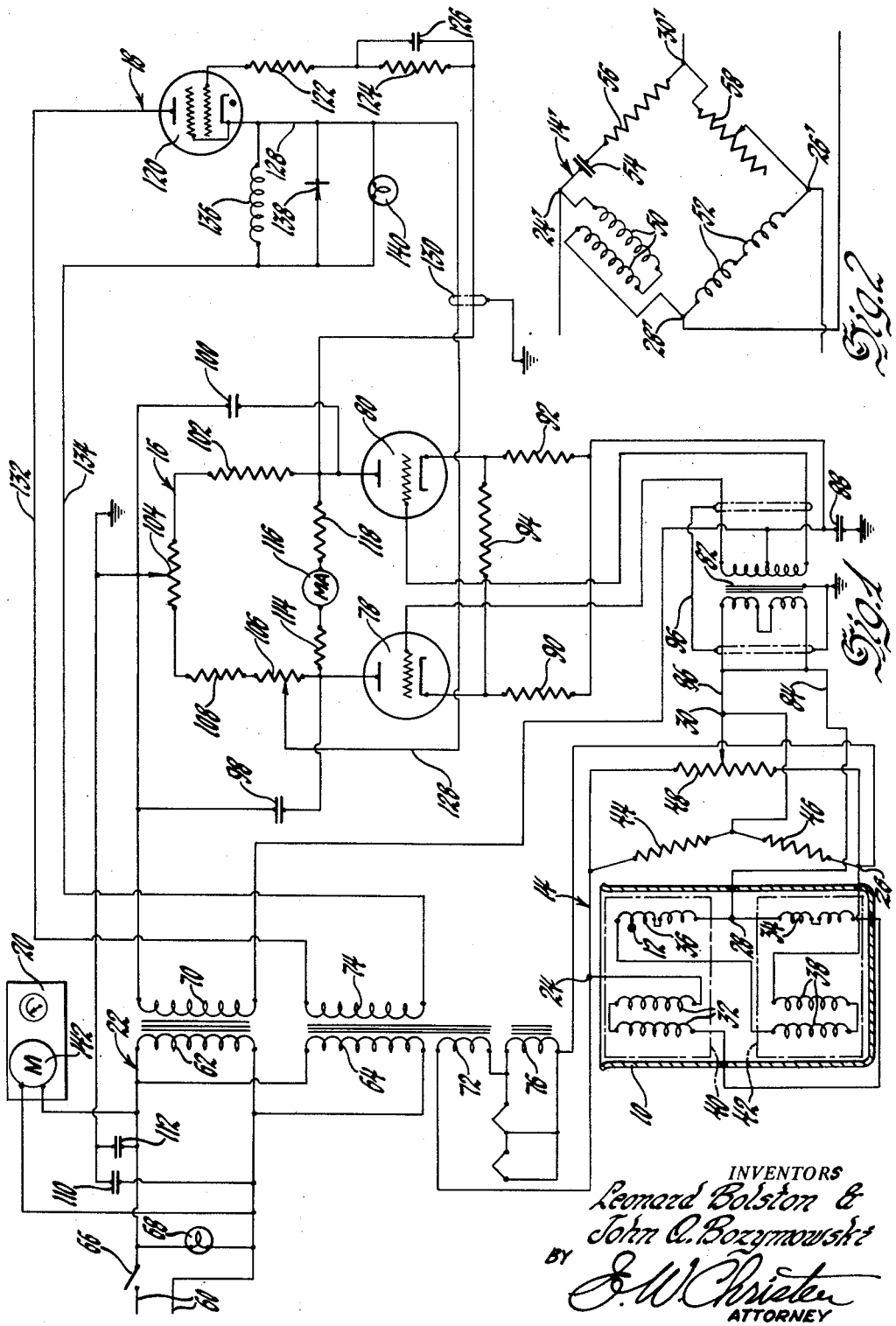
May 17, 1960     L. BOLSTON ET AL     2,937,334
HEAT TRANSFER TESTING APPARATUS
Filed Jan. 28, 1958
INVENTORS
Leonard Bolston &
John C. Bozymowski
BY
J. W. Christen
ATTORNEY

2,937,334
HEAT TRANSFER TESTING APPARATUS

Leonard Bolston, Mount Clemens, and John A. Bozymowski, Warren, Mich., assignors to General Motors Corporation, Detroit, Mich., a corporation of Delaware Application January 28, 1958, Serial No. 711,744

5 Claims. (Cl. 324—34)

This invention relates to testing apparatus and more particularly to an arrangement for evaluating the heat transfer capacity of materials. A particular field of application is the evaluation of quenching media used in metallurgical heat treatment processes in which the rate of temperature change is a significant factor. It is therefore desirable to ascertain the heat transfer capacity of the various quenching media.

This invention is based upon the behavior of metals described by Curie's law that the permeability of paramagnetic substances is inversely proportional to the absolute temperature up to the Curie point. At the Curie point, the substances cease to have a permeability in excess of unity and become non-magnetic. The Curie point of a given metal specimen may be utilized as a convenient reference temperature in the evaluation of quenching media since the occurrence of this known temperature is signified by the change in magnetic properties. A method and apparatus based upon this principle is described and claimed in the copending application S.N. 711,485, filed January 27, 1958, by Edward A. Bender for "Method of Evaluating Quenching Media," and assigned to the assignee of the present invention.

In accordance with this invention, an electronic circuit is provided for determining the occurrence of the Curie point in the temperature change of a metal specimen. This is accomplished by placing the specimen in the magnetic field of an inductance element to influence the inductance in accordance with the magnetic properties of the specimen. The specimen in a non-magnetic state introduces an eddy current loss in the inductance element and in a magnetic state additionally introduces an increase of inductance due to the increased permeability of the magnetic field medium. Circuit means responsive to inductance variation are connected with the inductance element to ascertain the magnetic character of the specimen. Preferably, a bridge circuit is utilized with the inductance element in one arm and the bridge is energized with alternating current and balanced in the absence of the specimen. When the specimen is disposed within the magnetic field of the inductance element its magnetic state is indicated by the phase of the bridge signal voltage and the occurrence of the Curie point is signified by a phase reversal of the signal voltage.

In determining the heat transfer rate of a particular quenching medium, it is desired to measure the elapsed time required to change the temperature of a standard specimen from a predetermined value to the Curie point. For example, a standard specimen may take the form of a spherical element of nickel having a known Curie point of 665° F. which is heated to 1625° F. and then immersed in a fluid quenching medium being evaluated. The elapsed time from the immersion of the specimen to the occurrence of the Curie point must be precisely measured. In accordance with this invention, the elapsed time is measured by utilizing the bridge circuit signal voltage to control the starting and stopping of a time indicator. This is accomplished by connecting a phase sensitive detector across the output terminals of the bridge circuit for developing a control voltage and utilizing a trigger circuit responsive to the control voltage for starting and stopping a motor driven time indicator.

A more complete understanding of this invention may be had from the detailed description which follows taken with the accompanying drawings in which:

Figure 1 is a schematic diagram of the inventive testing apparatus; and

Figure 2 is a schematic diagram of an alternative embodiment of the bridge circuit.

Referring now to the drawings, there is shown an illustrative embodiment of the invention in testing apparatus for measuring the elapsed time required for a particular quenching fluid to change the temperature of a specimen from a predetermined value to the Curie point. In general, the apparatus comprises a receptacle 10 which contains a liquid quenching medium to be evaluated and which is adapted to receive a standard metal specimen 12. A transducer or bridge circuit 14 is adapted to sense the magnetic condition of the specimen and produce a signal voltage phase reversal upon the occurrence of the Curie point of the specimen. The bridge circuit is coupled to a phase sensitive detector 16 which responds to the signal voltage to develop a control voltage having a polarity corresponding to the phase of the signal voltage. The control voltage is applied to the trigger circuit 18 which starts a time indicator 20 upon immersion of the specimen into the quenching medium and stops the time indicator upon the occurrence of the Curie point. The electrical circuits are energized from a conventional transformer power supply 22.

Considering the circuits in detail, the transducer or bridge circuit 14 is provided with a pair of input terminals 24 and 26, connected with the power supply 22 for energization with an alternating voltage in a manner to be described subsequently, and a pair of output terminals 28 and 30 for developing a signal voltage. In one arm of the bridge circuit, between the input terminal 24 and output terminal 28, are the non-inductive coil 32 and the inductance coil 34. The non-inductive coil 32 is suitably formed as a bifilar coil winding with the two series coil elements having the same direction of winding in close turn-to-turn proximity for flux cancellation to provide a non-inductive, resistive impedance. In the conjugate arm of the bridge between the output terminal 28 and the input terminal 26 are connected the inductor or inductance coil 36 and the non-inductive coil 38. The non-inductive coil 32 and the inductance coil 36 are wound upon the same coil form 40 and similarly the inductance coil 34 and non-inductive coil 38 are wound upon a coil form 42. The coil form 40 is disposed in the upper portion of a receptacle 10 and is adapted to receive the heated specimen 12 within the magnetic field of the inductance coil 36. The non-inductive coil 32 and the inductance coil 36 are suitably wound in four-in-hand fashion on the coil form 40 but are connected electrically in conjugate arms of the bridge circuit; similarly, the non-inductive coil 38 and the inductance coil 34 are wound on the coil form 42 but are connected in conjugate arms to ensure equal resistive impedance in both arms. This arrangement compensates for any temperature differential which may exist between the two coil forms which would produce unbalance of the bridge circuit. The bridge circuit is completed externally of the receptacle 10 by the other pair of conjugate arms one of which includes a resistor 44 between the input terminal 24 and the output terminal 30 and the other of which includes resistor 46 between the output terminal 30 and the input terminal 26. The bridge circuit is completed by the balancing potentiometer resistor 48 connected across the input terminals 24 and 26 and having its movable contact connected to the output terminal 30.

A functionally equivalent embodiment of the bridge circuit 14 is illustrated in Figure 2 as a bridge circuit 14'. In one arm of the bridge circuit 14' between the input terminal 24' and the output terminal 28' is a non-inductive coil 50 and in the conjugate arm is an inductor or inductance coil 52. The opposite arm of the bridge circuit includes a serially connected condenser 54 and resistor 56 and the conjugate arm includes a variable resistor 58. The non-inductive coil 50 and the inductance coil 52 are wound on the same coil form and have equal resistive impedance to provide temperature compensation.

Returning now to Figure 1, the bridge circuit 14 is energized with an alternating voltage from the transformer power supply 22 which in turn is energized by the supply lines 60 representing a voltage source such as a commercial power supply of 60 cycle frequency. The transformer power supply includes a pair of transformers having primary windings 62 and 64 connected in parallel across the supply lines 60 through a manual switch 66. An indicator lamp 68 is connected across the primary windings to indicate the on-off condition of the transformer power supply. The primary winding 62 is inductively coupled with the secondary windings 70 and 72 and the primary winding 64 is inductively coupled with the secondary windings 74 and 76. The energizing voltage for the bridge circuit 14 is derived across the series connection of secondary windings 72 and 76 and is applied across the input terminals 24 and 26 of the bridge circuit. As will appear hereinafter, the bridge circuit 14 in its balanced condition develops a null signal voltage across its output terminals 28 and 30. When the specimen 12 is disposed within the magnetic field of inductor 36, the bridge circuit 14 develops an unbalance or signal voltage of one-phase sense across its output terminals when the specimen is above the Curie point and develops a signal voltage of the opposite phase sense when the specimen is below the Curie point.

In order to develop a control voltage which corresponds in polarity to the phase sense of the signal voltage, there is provided a phase sensitive detector 16. The detector comprises a pair of amplifying devices or vacuum tubes 78 and 80 which have their respective input circuits, extending between grid and cathode, coupled to the output terminals of the bridge circuit 14 through the coupling transformer 82. The primary winding of the transformer is connected across the output terminals 28 and 30 of the bridge circuit through the conductors 84 and 86. The secondary winding of the coupling transformer has its center tap connected to ground through a condenser 88 and to the cathodes of the tubes 78 and 80 through resistors 90 and 92, respectively. The cathodes of the tubes 78 and 80 are interconnected through a resistor 94. The signal voltage conductors are suitably isolated from spurious or extraneous voltages by the shield 96. The output circuits of the tubes 78 and 80, extending between the plate and cathode of the respective tubes, are energized from the supply lines 60 with alternating voltage of the supply voltage phase which may be considered the reference phase. For this purpose, the plates of tubes 78 and 80 are connected respectively through condensers 98 and 100 to the upper terminal of transformer secondary winding 70 and the cathodes are connected through the respective resistors 90 and 92 to the lower terminal of the winding. The plate of tube 80 is connected through plate load resistor 102 and an adjustable portion of a potentiometer resistor 104 to ground. The plate of tube 78 is connected through a potentiometer resistor 106 and plate load resistor 108 and the other portion of resistor 104 to ground. The energizing voltage for the output circuits of tubes 78 and 80 is balanced to ground by a pair of voltage divider condensers 110 and 112 across the primary windings 62 and 64 and a connection of the junction of these condensers to ground. For balancing the phase detector circuit, the plates of the tubes 78 and 80 are connected together through a meter circuit including a series resistor 114, a microammeter 116 and a resistor 118. A direct current control voltage is derived from the phase sensitive detector 16 between the plates of the tubes 78 and 80 with a polarity depending upon which tube is conductive. The condenser 98 is charged during the conductive interval of tube 78 which occurs when the signal voltage is in phase agreement with the plate supply voltage applied to tube 78. Similarly, the condenser 100 is charged during the conductive period of tube 80 which occurs when the signal voltage is in phase disagreement with the supply voltage. This control voltage is supplied to the trigger circuit 18 in a manner to be described presently.

The trigger circuit 18 comprises a gas tetrode or thyratron tube 120 having its input circuit, extending between cathode and control grid, connected across the plates of tubes 78 and 80. The control grid of the thyratron tube 120 is connected to the plate of tube 80 through resistors 122 and 124 and shunt condenser 126. The cathode is connected through conductor 128 to the movable contact of potentiometer resistor 106 and the control voltage conductors are suitably isolated by the shield 130. The output circuit of the thyratron tube 126 is energized from the secondary winding 74 and extends between plate and cathode through the conductors 132 and 134. The output circuit includes the clutch energizing coil 136 of the time indicator 20 to be described presently. Connected across the energizing coil 136 is a rectifier or diode 138 which is poled for forward conduction upon collapse of the magnetic field of the coil to permit fast energization and deenergization of the clutch coil and to prevent deenergization of the coil between conducting half cycles of the thyratron tube. An indicator lamp 140 is also connected across the coil 136 to indicate the conductive state of the trigger circuit 18. It will be apparent that the thyratron tube 120 is conductive when the control voltage developed by the phase sensitive detector 16 is of such polarity to make the control grid positive with respect to the cathode and the thyratron tube is non-conductive when the control voltage polarity drives the control grid negative with respect to the cathode.

The time indicator 20 is started and stopped in accordance with the conductive state of the trigger circuit 18 and includes a timer motor 142 which is connected across the supply voltage conductors 60 for energization thereby. When the clutch coil 136 is energized the motor is connected to the indicator drive train thus initiating the measurement of an elapsed time interval. When the clutch coil 136 is deenergized the time indicator is disconnected from the motor and the elapsed time measurement is terminated.

The operation of the apparatus just described will be readily understood from consideration of a typical cycle. Consider, for example, the measurement of the rate of heat transfer of a particular quenching medium using the standard metal specimen 12 of nickel having a Curie point of 665° F. The specimen is initially heated to 1625° F. in preparation for the test. With the manual switch 66 closed, the circuits are energized from the supply lines 60 with an alternating voltage which may be taken as the reference phase. The bridge circuit 14 is initially balanced and with the signal voltage at null value the specimen is immersed in the quenching medium within the magnetic field of the inductor 36. At its initial temperature above the Curie point, the specimen is non-magnetic and causes unbalance of the bridge circuit by reason of the eddy current loss in the specimen. This bridge circuit unbalance produces a signal voltage of the reference phase at the output terminals of the bridge which is applied through coupling transformer 82 to the input circuit of the phase sensitive detector 16. Since the tubes 78 and 80 are energized with the supply voltage of reference phase, the grid of tube 78 will be going positive at the same time that the plate of tube 78 is going positive and thus this tube will be conductive and tube 80 will be non-conductive. Accordingly, the plate voltage of tube 80 will be more positive than that of tube 78 and a positive direct current control voltage will be applied to the grid of the thyratron tube 120 of the trigger circuit 18. Accordingly, the thyratron tube will become conductive and the clutch coil 136 will be energized to connect the motor 142 to the drive train of the indicator 20. Thus the time indicator is started instantaneously upon immersion of the specimen in the quenching medium.

Upon occurrence of the Curie point in the temperature change of the specimen 12, the specimen changes in character from non-magnetic to magnetic. The increased permeability causes an increase of the inductance of inductor 12 and the bridge is unbalanced to produce a signal voltage opposite in phase to the reference voltage. This phase reversal of the signal voltage causes the grid of tube 80 to become positive at the same time the plate becomes positive and tube 80 becomes conductive while tube 78 becomes non-conductive. Accordingly, the plate of tube 80 becomes more negative than the plate of tube 78 and a negative direct current voltage is applied to the control grid of the thyratron tube 120 of trigger circuit 18. Thus the thyratron tube becomes nonconductive and the clutch coil 136 is deenergized to interrupt the drive train of the indicator 20. Accordingly, the elapsed time required for the temperature change of the specimen 12 from the predetermined value to the Curie point is measured. This data is taken as an index of the heat transfer capacity of the quenching medium under test.

Although the description of this invention has been given with respect to a particular embodiment, it is not to be construed in a limiting sense. Many variations and modifications within the spirit and scope of the invention will now occur to those skilled in the art. For a definition of the invention, reference is made to the appended claims.

We claim:

1. In an instrument for measuring the elapsed time required to change the temperature of a specimen from a predetermined value to the Curie point, the combination of a bridge circuit including an inductor in one arm and impedance elements in the remaining arms for balancing the bridge circuit, an alternating voltage source connected across the input terminals of the bridge circuit, said inductor being adapted to receive the specimen within its magnetic field to influence the inductance thereof and produce a signal voltage across the output terminals of the bridge having a phase corresponding to the magnetic condition of the specimen, a phase sensitive detector connected across the output terminals of the bridge circuit to develop a control voltage having polarity corresponding to the phase of the signal voltage, an elapsed time indicator including an energizing circuit connected with the phase sensitive detector and responsive to the control voltage for starting and stopping said time indicator.

2. In an instrument for measuring the elapsed time required to change the temperature of a specimen from a predetermined value to the Curie point, the combination of a bridge circuit including an inductor in one arm and impedance elements in the remaining arms for balancing the bridge circuit, an alternating voltage source connected across the input terminals of the bridge circuit, said inductor being adapted to receive the specimen within its magnetic field to influence the inductance thereof and produce a signal voltage across the output terminals of the bridge having a phase corresponding to the magnetic condition of the specimen, a phase sensitive detector connected across the output terminals of the bridge circuit to develop a control voltage having polarity corresponding to the phase of the signal voltage, a trigger circuit connected with the detector and being conductive or non-conductive in accordance with the polarity of the control voltage, an elapsed time indicator including an energizing circuit connected with the trigger circuit for starting and stopping said time indicator.

3. In an instrument for measuring the elapsed time required to change the temperature of a specimen from a predetermined value to the Curie point, the combination of a bridge circuit including an inductor and an inductive reactance serially connected in one pair of conjugate arms and a pair of resistors serially connected in the other pair of conjugate arms for balancing the bridge circuit, an alternating voltage source connected across the input terminals of the bridge circuit, said inductor being adapted to receive the specimen within its magnetic field to influence the inductance thereof and produce a signal voltage across the output terminals of the bridge having a phase corresponding to the magnetic condition of the specimen, a phase sensitive detector connected across the output terminals of the bridge circuit to develop a control voltage having polarity corresponding to the phase of the signal voltage, a trigger circuit connected with the detector and being conductive or non-conductive in accordance with the polarity of the control voltage, an elapsed time indicator including an energizing circuit connected with the trigger circuit for starting and stopping said time indicator.

4. In an instrument for measuring the elapsed time required to change the temperature of a specimen from a predetermined value to the Curie point, the combination of a bridge circuit including an inductor and a resistor serially connected in one pair of conjugate arms and a capacitive reactance and a resistor connected in the other pair of conjugate arms for balancing the bridge circuit, an alternating voltage source connected across the input terminals of the bridge circuit, said inductor being adapted to receive the specimen within its magnetic field to influence the inductance thereof and produce a signal voltage across the output terminals of the bridge having a phase corresponding to the magnetic condition of the specimen, a phase sensitive detector connected across the output terminals of the bridge circuit to develop a control voltage having polarity corresponding to the phase of the signal voltage, a trigger circuit connected with the detector and being conductive or non-conductive in accordance with the polarity of the control voltage, an elapsed time indicator including an energizing circuit connected with the trigger circuit for starting and stopping said time indicator.

5. In an instrument for measuring the elapsed time required to change the temperature of a specimen from a predetermined value to the Curie point, the combination of a bridge circuit including an inductor in one arm and impedance elements in the remaining arms for balancing the bridge circuit, an alternating voltage source connected across the input terminals of the bridge circuit, said inductor being adapted to receive the specimen within its magnetic field to influence the inductance thereof and produce a signal voltage across the output terminals of the bridge having a phase corresponding to the magnetic condition of the specimen, heat exchange means for changing the temperature of the specimen through the Curie point, a phase sensitive detector connected across the output terminals of the bridge circuit to develop a control voltage having polarity corresponding to the phase of the signal voltage, a trigger circuit connected with the detector and being conductive or non-conductive in accordance with the polarity of the control voltage, an elapsed time indicator including an energizing circuit connected with the trigger circuit for starting and stopping said time indicator.

References Cited in the file of this patent

UNITED STATES PATENTS

| | | |
|---|---|---|
| 2,020,067 | Keinath | Nov. 5, 1935 |
| 2,124,577 | Knerr | July 26, 1938 |
| 2,489,920 | Michel | Nov. 29, 1949 |
| 2,717,515 | Pesante | Sept. 13, 1955 |
| 2,730,894 | Husa | Jan. 14, 1956 |
| 2,765,330 | Kirshenbaum | Oct. 2, 1956 |